United States Patent [19]

Guins

[11] Patent Number: 4,657,611
[45] Date of Patent: Apr. 14, 1987

[54] CROSS CORRUGATED FIBERBOARD AND METHOD AND APPARATUS FOR MAKING THE SAME

[75] Inventor: Sergei G. Guins, Okemos, Mich.

[73] Assignee: Kaser Associates, Inc., Okemos, Mich.

[21] Appl. No.: 675,881

[22] Filed: Nov. 28, 1984

[51] Int. Cl.[4] .................... B32B 3/28; B32B 31/04
[52] U.S. Cl. .................................. 156/157; 156/207; 156/210; 156/269; 156/304.1; 428/184; 428/186
[58] Field of Search .............. 428/58, 59, 185, 186, 428/44, 50, 56; 156/157, 207, 210, 293, 304.1, 269

[56] References Cited

U.S. PATENT DOCUMENTS

| | | | |
|---|---|---|---|
| 1,207,734 | 12/1916 | Feeley | 428/59 |
| 1,504,218 | 8/1924 | Crowell | 156/207 |
| 3,096,224 | 7/1963 | Goldstein et al. | 428/186 |
| 3,293,107 | 12/1966 | Wells et al. | 428/186 |
| 3,542,636 | 11/1970 | Wandel | 428/185 |
| 4,128,677 | 12/1978 | Hoelzinger | 428/185 |
| 4,435,237 | 3/1984 | Hoelzinger | 428/185 |
| 4,498,949 | 2/1985 | Soennichsen | 156/210 |

Primary Examiner—Paul J. Thibodeau
Attorney, Agent, or Firm—Gifford, Groh, VanOphem, Sheridan, Sprinkle & Dolgorukov

[57] ABSTRACT

There is disclosed a cross corrugated fiberboard having at least one layer of corrugations running in a longitudinal direction. A method and apparatus for making such a cross corrugated fiberboard is disclosed which first produces a single-wall corrugated fiberboard having a transversely corrugated fiberboard member glued between upper and lower facings which are offset from each other. The intermediate product is cut into pieces of a length equal to the desired width of the finished product, and these pieces are glued together seriatim with their corrugations in a longintudinal direction by the use of the offset portions of the facings. Additional layers of transversely corrugated single-faced or other type corrugated fiberboard may be built up on the longitudinally corrugated layer to make many continuous cross corrugated fiberboard products.

4 Claims, 10 Drawing Figures

4,657,611

CROSS CORRUGATED FIBERBOARD AND METHOD AND APPARATUS FOR MAKING THE SAME

BACKGROUND OF THE INVENTION

1. Field of Invention

The present invention relates to corrugated fiberboard, and more particularly to a double-wall or triple-wall corrugated fiberboard wherein the corrugations of at least one layer run longitudinally, while the corrugations of the other layers run transversely. A method and apparatus for making such a product is also disclosed.

2. Description of the Prior Art

A pre-filling search of patentability was made on the present invention, and the following patents were found:

| Date | Patentee | No. |
| --- | --- | --- |
|  | (Australian) | 221,347 |
| 1924 | C. H. Crowell | 1,504,218 |
| 1936 | E. Rudin et al. | 2,054,867 |
| 1939 | J. E. Kieffer | 2,177,490 |
| 1956 | S. Goldstein et al. | 2,759,523 |
| 1957 | A. E. Carlson | 2,780,572 |
| 1960 | S. Goldstein | 2,949,151 |
| 1961 | H. R. Anderson | 2,985,553 |
| 1962 | C. I. Elliott | 3,036,752 |
| 1963 | R. Z. Hollenback | 3,112,184 |
| 1966 | S. Goldstein et al. | 3,290,205 |
| 1969 | K. Wandel | 3,449,517 |

Most of the above-listed references disclose some type of corrugated fiberboard, and thus are believed relevant to the examination of the present application, although it is my opinion that none of them disclose the particular construction used in my invention.

Furthermore, particular attention is called to U.S. Pat. No. 1,504,218, issued Aug. 12, 1924, to C. H. Crowell. It is believed that the method disclosed in Crowell is the closest piece of prior art of which I am aware concerning the method of making my improved corrugated fiberboard product.

SUMMARY OF THE INVENTION

The method of making my cross corrugated fiberboard has as a first step the producing of a single-wall corrugated fiberboard having a transversely corrugated fiberboard member glued between upper and lower facings which are offset from each other. The intermediate product so produced is then cut into pieces of a length equal to the desired width of the finished double-wall or triple-wall corrugated fiberboard. These pieces are glued together seriatim with their corrugations now in a longitudinal direction by the use of the offset portions of the facing to form a continuous single-wall corrugated fiberboard having a longitudinally corrugated fiberboard member between an upper and a lower facing.

To make a double-wall corrugated fiberboard, a single-faced corrugated fiberboard is simply unrolled, corrugations down, and glued to the upper facing of the fiberboard, thereby forming a continuous double-wall cross corrugated fiberboard.

To make a triple-wall corrugated product, a further single-faced corrugated layer may be glued, corrugations up, by means well known in the art to the lower facing of the product formed thus far, thereby forming a continuous triple-wall cross corrugated fiberboard.

Thus, it is an object of the present invention to provide an improved method for making a cross corrugated fiberboard.

A further object of the present invention is to provide an improved apparatus for making a cross corrugated fiberboard of the foregoing nature.

A further object of the present invention is to make a cross corrugated fiberboard of a double-wall or triple-wall configuration.

A further object of the present invention is to make a cross corrugated fiberboard wherein the longitudinally corrugated fiberboard is manufactured without splices or overlaps in the corrugated member.

Further objects and advantages of the present invention will be apparent from the following description and appended claims, reference being made to the accompanying drawings forming a part of this specification, wherein like reference characters designate corresponding parts in the several views.

It is to be understood that the present invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description, and not of limitation.

DESCRIPTION OF THE PREFERRED EMBODIMENT

Figure 1:
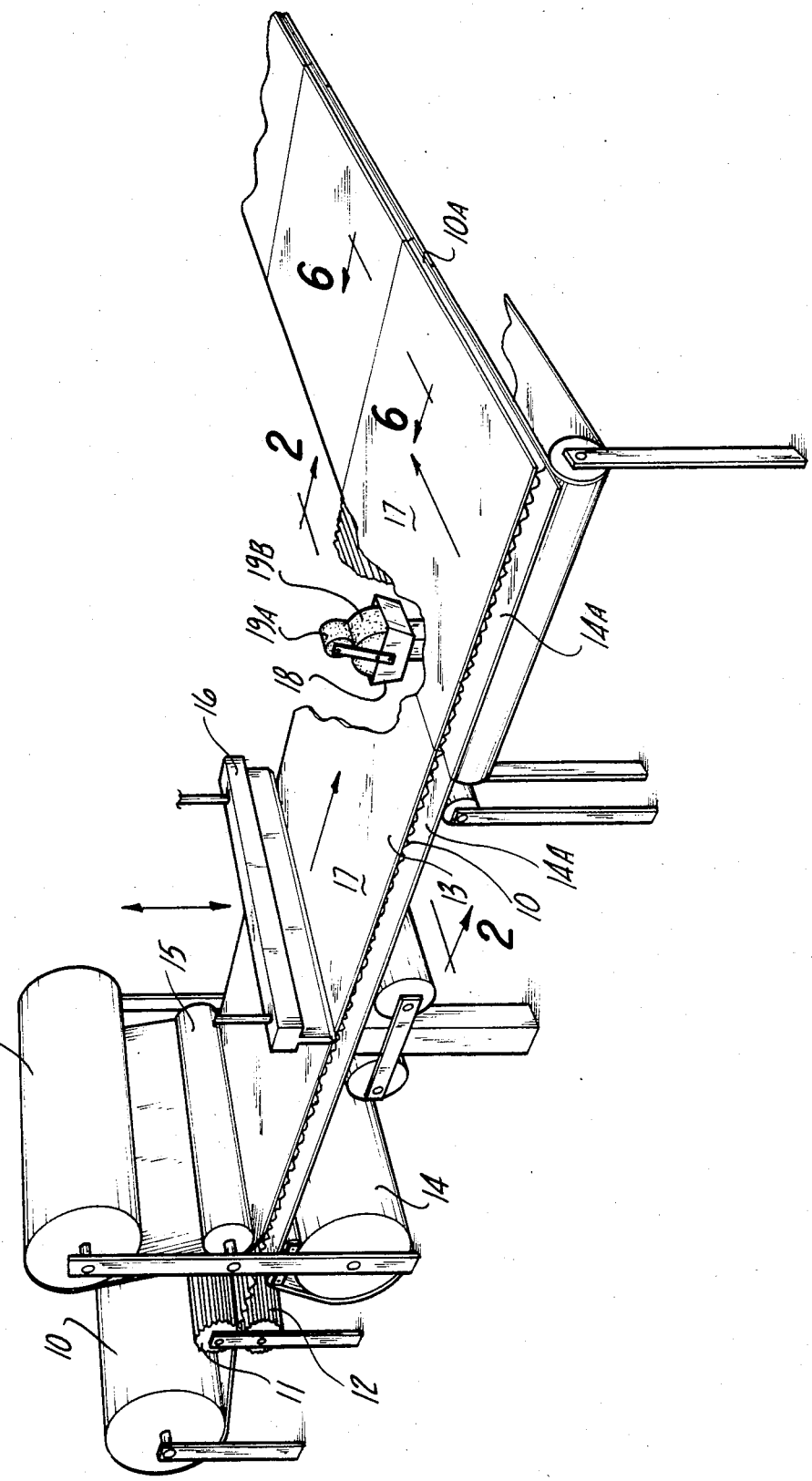
FIG. 1 is a perspective view showing an illustrative apparatus for manufacturing the cross corrugated fiberboard of the present invention.

Referring to FIG. 1, a portion of a machine for manufacturing my cross corrugated fiberboard is shown. The manufacturing process begins by providing a source, in this case a roll, of fiberboard 10, and passing it through suitable corrugating rollers 11 and 12, where the fiberboard 10 is corrugated transversely of the direction of the travel of the board.

Immediately downstream of the corrugating rolls 11 and 12, an upper facing 13 is provided in roll form, as is a lower facing 14. The upper facing, by means of guide roll 15 is secured to the top side of the now corrugated fiberboard 10 by means well known in the art. It can be seen that the upper facing 13 is secured in alignment with the fiberboard 10. However, the lower facing 14 is applied to the underside of the corrugated fiberboard 10 in an offset position, resulting in an exposed portion 14A of the lower facing 14, and exposed corrugations 10A being produced.

Shearing means 16 cut the resulting product into predetermined lengths, resulting at this stage in a series of pieces wherein each piece has a corrugated fiberboard member 10 glued between an aligned, like sized piece of upper facing 13, and a like sized piece of lower facing 14 offset from its corresponding piece of upper facing. Generally, the length of the resulting piece 17 should be equal to the desired width of the intermediate cross corrugated fiberboard. As the pieces 17 cut by the shearing means 16 advance along the conveyor 20, they pass over sufficient glue rollers 19A to have adhesive applied to the exposed corrugations 10A resulting from the lower facing 14 being offset from the corrugated fiberboard member 10.

Figure 2:
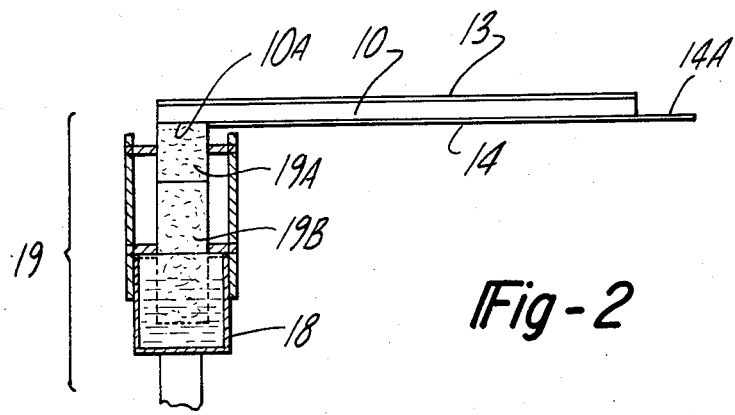
FIG. 2 is a sectional view, taken in the direction of the arrows, along the section line 2—2 of FIG. 1.

Referring to FIG. 2, the glue roller assembly, generally designated by the numeral 19, comprises a suitably mounted upper roller 19A in contact with a lower roller 19B which rotates in a sufficient amount of glue held in the reservoir 18.

Figure 3:
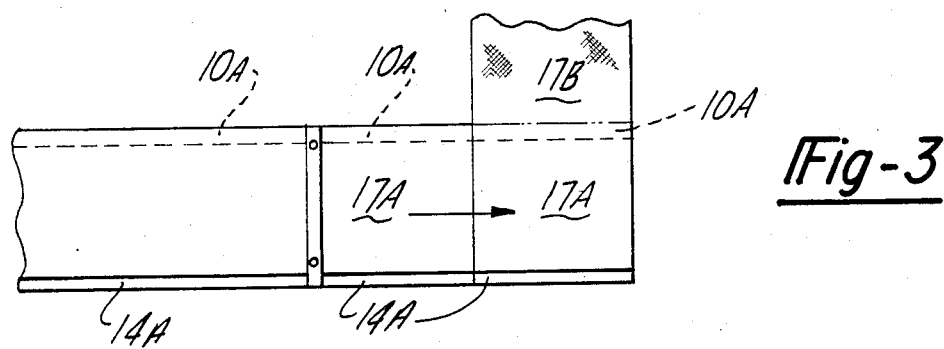
FIG. 3 is a partial plan view of the apparatus shown in FIG. 1 illustrating how the transversely corrugated intermediate fiberboard having offset facings is cut to length and glued seriatim to form a continuous longitudinally corrugated fiberboard.
Figure 4:
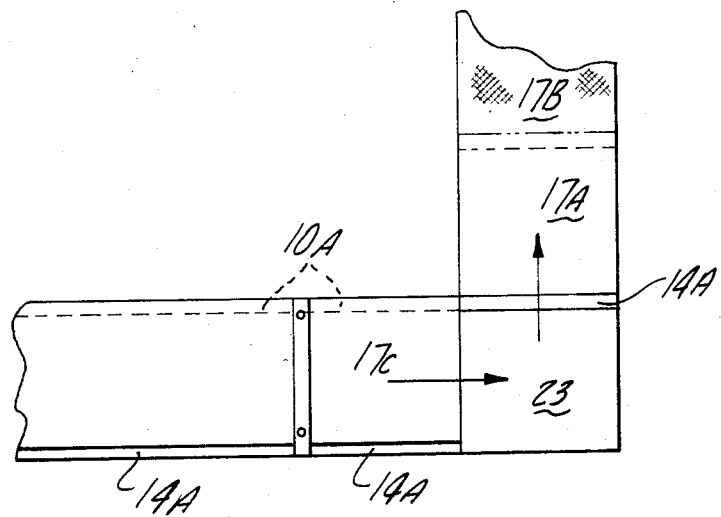
FIG. 4 is a partial elevational view, similar to that shown in FIG. 3, and showing the next sequential step in the formation of the continuous longitudinally corrugated component of my invention.

Referring to FIGS. 3 and 4, as well as FIG. 1, it can be seen that after the pieces 17 pass over the glue roller assemblies 19, they pass on to a right-angle conveyor 23, which is advanced in a step fashion in steps equal to the width of the transversely corrugated fiberboard pieces 17. It should be understood that if it is desired to have the entire manufacturing process run in a straight-line fashion, the pieces 17 could be rotated for 90°, and with alternate gluing means for gluing the pieces 17 together, could continue in a straight line without a right-angle conveyor. However, I prefer to have the right-angle conveyor 23 because of the unique opportunity presented for joining the pieces 17 in a continuous longitudinal strip by virtue of the gluing together of the exposed corrugations 10A, and the exposed portions 14A of the lower facing 14.

Referring to FIGS. 3 and 4, the different positions of the pieces can be seen. In FIG. 3, pieces 17A and 17B have just been adhesively joined together. They are now advanced down the right angle conveyor a distance equal to the width of the piece 17C shown in FIG. 4. At this point, piece 17A has the exposed portion 14A of lower facing 14 exposed when the next piece in line 17C, with glue freshly applied to exposed corrugations 10A, proceeds over portion 14A, and is adhesively secured thereto.

For ease of drying, etc., heat may be applied by means well known in the art. Pieces 17A and 17C are now joined as shown in FIG. 4 and then the assembly consisting of pieces 17C, 17A and 17B will advance one step making room for the next piece to be secured, thereby producing a continuous longitudinally corrugated fiberboard. After this step, the longitudinally corrugated strip proceeds to the portion of the machinery illustrated in FIG. 5.

Shortly after the start of the right-angle conveyor 23, there is operatively mounted a roll of single-faced corrugated fiberboard which passes through guide rollers 31 and 32, corrugations down, and then through pressure rollers 33 and 34, where it is secured continuously by means well known in the art to the pieces 17 forming the longitudinally corrugated fiberboard. As before, the type of adhesive, and whether heat or additional pressure may be needed, depend upon the application to which the corrugated product is to be put.

Figure 7:
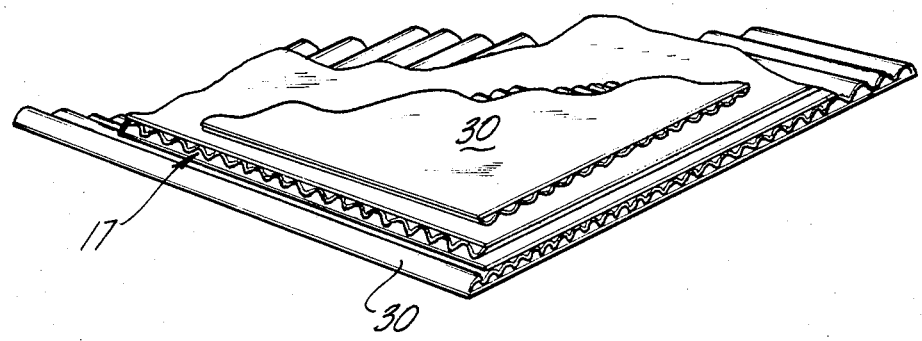
FIG. 7 is a broken away perspective view of a triple-wall corrugated fiberboard after additional layers of single-faced corrugated fiberboard is glued to the product being produced by the apparatus shown in FIG. 5.
Figure 6:
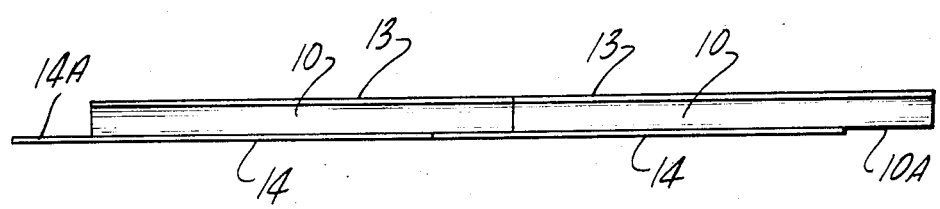
FIG. 6 is a sectional view, taken in the direction of the arrows, along the section line 6—6 of FIG. 1.

The product thus formed is a double-wall corrugated fiberboard having one layer of longitudinal and one layer of transverse corrugations which provide greatly increased strength, and will have a wide applicability in packaging difficult and heavy products. If desired, a triple-wall corrugated product can be formed having a middle layer of longitudinal corrugations and an upper and lower layer of transverse corrugations by providing an additional roll 30 of single-faced corrugated material, guide rollers 31 and 32, and pressure rollers 33 and 34, to apply the additional single-faced corrugated layer, corrugations up, to the underside of the pieces 17 as they proceed down the right-angle conveyor 23. Presuming that this additional layer is applied, a broken away view of the triple-wall corrugated fiberboard is shown in FIG. 7.

The middle layer of the triple-wall corrugated fiberboard consists of the pieces 17 glued together seriatim and consisting of the upper facing 13 and the lower facing 14 applied to the fiberboard 10.

Figure 5:
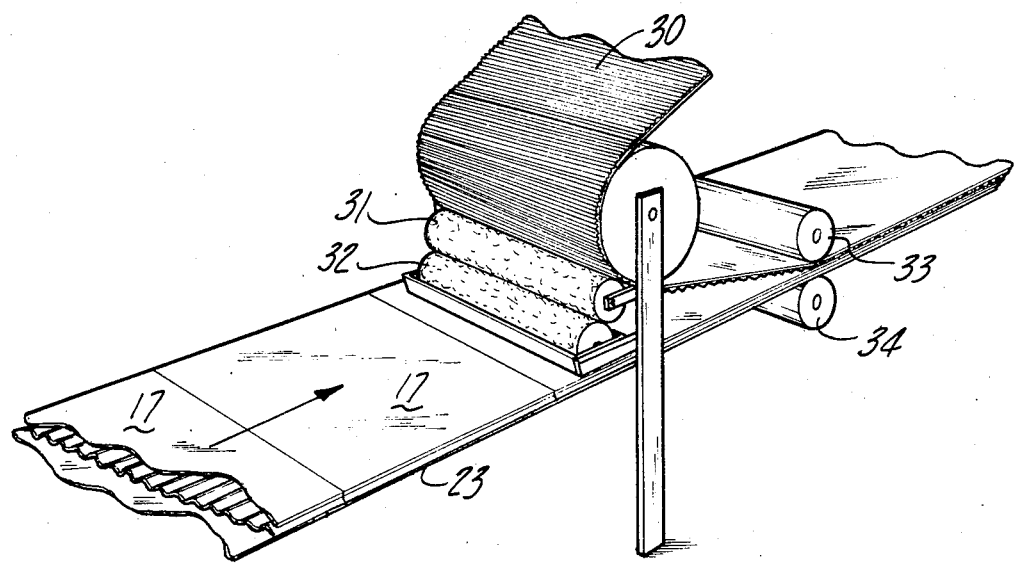
FIG. 5 is a partial perspective view of additional apparatus showing the gluing of a single-faced corrugated fiberboard, corrugations down, to the top facing of the continuous longitudinally corrugated product formed by the apparatus of FIG. 1.
Figure 8:
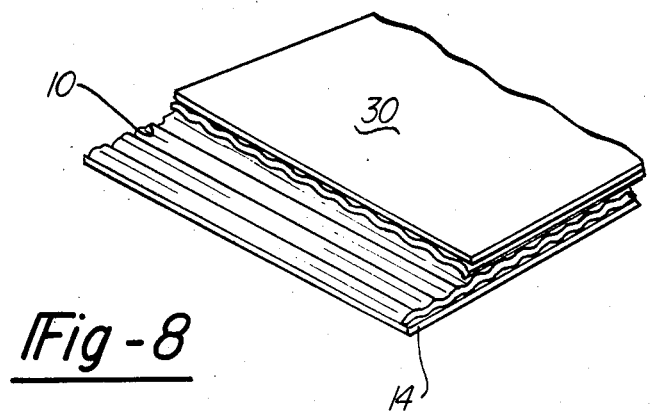
FIG. 8 is a broken away perspective view of the product being produced by the apparatus shown in FIG. 5, but without the upper facing 13 being applied to the longitudinal corrugations.

Another variation of my product is shown in FIG. 8, and is a modified double-wall corrugated product made by the method shown in FIGS. 1 and 5, but by omitting the upper facing 13. In this case, the corrugated fiberboard 10 is secured to the lower facing 13 by the means previously described, but instead of then applying the upper facing 14, the single-wall corrugated fiberboard 30 is applied directly over the corrugated member 10, plus that the corrugations of the single-wall corrugated fiberboard are glued or otherwise secured directly to the corrugated fiberboard 10.

My improved method of making the intermediate longitudinally corrugated fiberboard is a great advance over the prior art shown in U.S. Pat. No. 1,504,216 to C. H. Crowell. In his patent, the inventor described how pieces of corrugated fiberboard 50 are manufactured and spliced seriatim before feeding the same into the remainder of his apparatus. A view of how this overlap appears before further processing is shown in FIG. 9 wherein there are shown two corrugated members 50 having their end regions overlapped for a short distance before they are fed into the splicing and feeding rolls.

Figure 9:
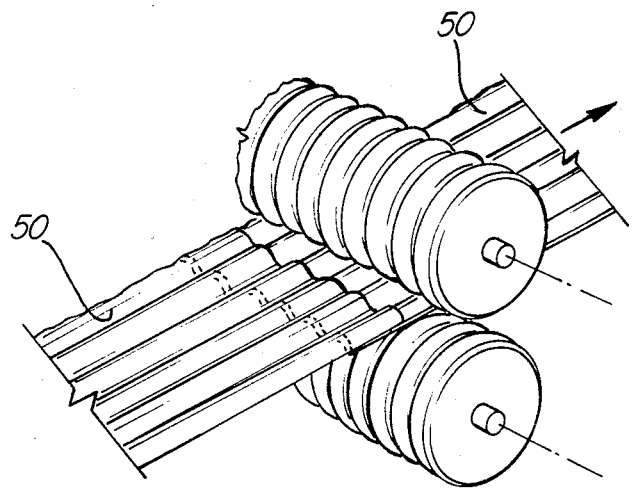
FIG. 9 is a perspective view showing how pieces of corrugated cardboard having their corrugations in the longitudinal directional are overlapped and sliced in the prior art before being further processed.
Figure 10:
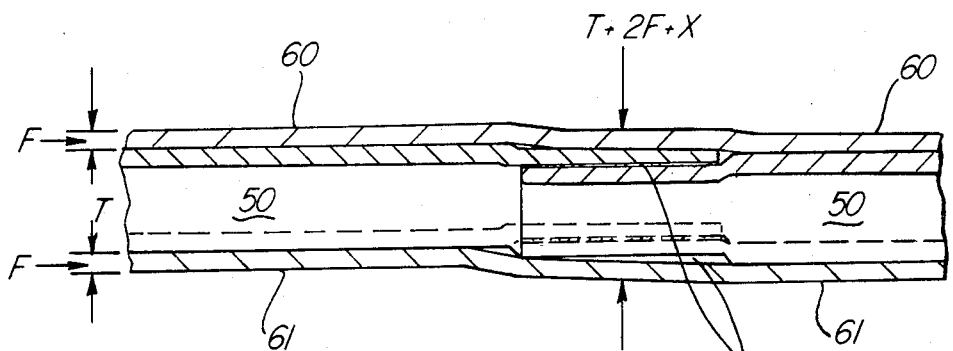
FIG. 10 is an elevational view showing the thickening and crushing of the joint that will result in the prior art product when the overlapping portions of the corrugations are rolled in an attempt to achieve the same thickness as either of the corrugated members.

Referring to FIG. 10, there is shown an elevational view of the construction shown in FIG. 9 after it has passed through the splicing and feeding rolls and has had an upper facing 60 and a lower facing 61 applied to the corrugated members 50. Away from the joint region the thickness of the construction is represented by the equation $T+2F$, where T represents the thickness of one corrugated member and F represents the thickness of the upper or lower facing. As can be seen around the joint region, however, the thickness is represented by the equation $T+2F+X$, as the joint region is thicker by an amount X due to the air gaps present where the facings 60 and 61 cannot conform exactly to the configuration of the overlap of the two corrugated members 50, and the increase in thickness provided because the crushing of each end of the corrugated member is something less than one half its thickness. Thus, even after the destructive crushing by the splicing and feeding rolls there will be, of necessity, some thickening of the Crowell construction at each splice.

It is believed that this destructive crushing and/or a thickening of the joint will result whether the overlapping of two longitudinally corrugated members takes place, such as in the aforementioned patent to Crowell, or the overlapping of transverse member should this for some reason be desired.

Because of my improved method of making the intermediate longitudinally corrugated fiberboard without the destructive crushing and/or thickening of the joints shown in the prior art when the transversely corrugated fiberboard members are joined, such as shown in U.S. Pat. No. 1,504,216 to C. H. Crowell, a greatly improved product results, with increased strength and durability. Since this product is being produced continuously, the length and width are limited only by the size of the machinery used.

Although forming no part of the present invention, it can be understood that the finished product may be cut to any desired size and formed into any desired product. It is contemplated that the triple-wall corrugated fiberboard will be used alone, or with wood, for the packing of extremely large and heavy articles.

It can be seen that my particular method lends itself to making any number of layers of corrugated product by interspersing one or more layers of my uniquely manufactured longitudinally corrugated single-wall fiberboard with the desired number of layers of single-faced corrugated fiberboard to form any desired thickness of corrugated cardboard product.

Thus, by abandoning the mechanical splicing of transversely corrugated fiberboard, and continuously forming and joining pieces of transversely corrugated single-wall corrugated fiberboard having the lower facing offset to form an intermediate, continuous, longitudinally corrugated fiberboard to which additional layers of single-faced corrugated fiberboard are secured in the proper orientation, I have developed a better cross corrugated fiberboard, together with a better method and apparatus for manufacturing the same.

I claim:

1. A method of manufacturing a fiberboard having one layer of corrugations, said method including the steps of:
   (a) forming a longitudinally corrugated fiberboard layer by;
   (i) joining an upper facing material to a transversely corrugated fiberboard member of equal width in alignment therewith;
   (ii) joining a lower facing material, also of equal width, to the underside of said corrugated fiberboard in an offset manner to produce exposed corrugations adjacent one edge of said lower facing, and exposed lower facing adjacent the opposite edge of said lower facing;
   (iii) cutting the product so produced into predetermined lengths;
   (iv) applying adhesive to said corrugations; and
   (v) continually joining said pieces seriatum.

2. The method defined in claim 1, and including the additional steps necessary to form a double wall corrugated fiberboard having one layer of longitudinal corrugations and one layer of transverse corrugations, said additional steps including:
   (a) continuously, orthogonally, applying to the top side of said longitudinally corrugated fiberboard layer a layer of singled faced transversely corrugated fiberboard with the corrugations of said layer of single faced corrugated fiberboard being in contact with said upper facing material.

3. A method of manufacturing a double wall corrugated fiberboard having one layer of longitudinal corrugations and one layer of transverse corrugations, said method including the steps of:
   (a) forming a longitudinally corrugated fiberboard layer by:
   (i) joining a lower facing material to a transversely corrugated fiberboard member of equal width in an offset manner to produce exposed corrugations adjacent one edge of said lower facing and exposed lower facing adjacent the opposite edge of said lower facing;
   (ii) cutting the product so produced into predetermined lengths;
   (iii) applying adhesive to said exposed corrugations;
   (iv) joining said pieces seriatim to form a continuous strip of longitudinally corrugated fiberboard, and;
   (b) orthogonally applying to the top side of said longitudinally corrugated fiberboard layer, corrugations down, a layer of single-faced transversely corrugated fiberboard.

4. The method defined in either one of claims 2 or 3, and including the additional steps necessary to form a triple wall corrugated fiberboard having a middle layer with longitudinal corrugations and an upper layer and a lower layer with transverse corrugations, said additional steps including:
   (a) orthogonally applying an additional layer of single faced corrugated fiberboard, corrugations up, to the underside of said longitudinally corrugated fiberboard.

* * * * *